United States Patent [19]

Laszlo

[11] 4,060,410

[45] Nov. 29, 1977

[54] PROCESS FOR REMOVING HEAVY METALS FROM FLUID MEDIA

[76] Inventor: Marcel Laszlo, Utmarksvagen 17, 151 52 Södertälje, Sweden

[21] Appl. No.: 702,791

[22] Filed: July 6, 1976

[30] Foreign Application Priority Data

July 7, 1975 Sweden .............................. 75077438

[51] Int. Cl.² ............................................. C22B 5/00
[52] U.S. Cl. ......................................... 75/109; 75/81; 75/117; 75/118 R; 75/119; 75/120; 75/121; 423/87
[58] Field of Search ................. 75/109, 121, 117, 120, 75/118 R, 119, 81; 423/87

[56] References Cited

U.S. PATENT DOCUMENTS

| 1,119,377 | 12/1914 | Thornhill | 75/109 X |
|---|---|---|---|
| 1,136,872 | 4/1915 | Hamilton | 75/109 |
| 1,963,893 | 6/1934 | Drouilly | 75/109 |
| 3,697,567 | 10/1972 | Taylor | 75/109 X |
| 3,744,990 | 7/1973 | Wilson | 75/109 X |

*Primary Examiner*—G. Ozaki
*Attorney, Agent, or Firm*—Blanchard, Flynn, Thiel, Boutell & Tanis

[57] ABSTRACT

A process in which metal foil is introduced into a fluid containing one or more heavy metals, so that one part of the surface of the foil is in contact with the fluid and another part thereof is in contact with air and that an activator in the form of a solution of a complex compound, preferably based on the metal comprising the foil, preferably an NaAl complex, is brought into contact with the foil and the fluid whereby the metal or metals precipitate and after precipitation are separated from the fluid in a way known per se.

17 Claims, No Drawings

PROCESS FOR REMOVING HEAVY METALS FROM FLUID MEDIA

The present invention relates to a process for removing heavy metals by precipitation for the purpose of destruction, recovery or extraction of the heavy metals from gaseous or liquid media, e.g. waste from industries, but also pickling and leaching solutions etc. which contain such metals in some state.

In precipitation for the purpose of destruction or recovery it is generally a question of purifying gaseous or liquid media, in the former case particularly gaseous media containing very small amounts of heavy metals.

In precipitation for the purpose of extraction it is a question of the production of metals by dissolution of metal bearing minerals etc. and precipitating the metal or metals in an elemental state. This process can be applied in particular for the production of such metals which are difficult to produce using the prevailing processes, usually metallurgical processes; nickel may be mentioned as an example of such metals.

It is known to precipitate heavy metals from water solutions, e.g. in the form of sulfides. In the precipitation of sulfides the lowest limit for the residual amount of heavy metal in the solution after precipitation is theoretically about 3 mg/liter and in practice this lower limit is 10 mg/liter. Apart from obtaining relatively high residual contents of heavy metal in this process, it is also burdened with several drawbacks, e.g. a large remaining excess of sulfide. A further serious drawback is that organic heavy metal compounds cannot be precipitated.

It has now been surprisingly found possible to circumvent these drawbacks and achieve all the objects set forth in the introduction by means of a process in which a metal sheet, e.g. an aluminum sheet, is introduced into a fluid containing one or more heavy metals, so that one part of the surface of the sheet is in contact with the fluid and another part thereof is in contact with air and that an activator in the form of a solution of a complex compound, preferably based on the metal comprising the sheet, preferably an NaAl complex, is brought into contact with the sheet and the fluid whereby the metal or metals precipitate and after precipitation are separated from the fluid in a way known per se. The activator can be produced by having its components mixed together in situ. If the fluid is liquid, its pH is suitably between 2 and 13. Subsequent to termination of the reaction, the precipitated metal can be discarded, but thanks to its being precipitated in pure, elemental form, and not in the form of a voluminous mass, it can often be recovered or extracted for further working in a particularly practical and convenient manner.

The invention is primarily applied for removing and possibly recovering metals from liquid media in the form of solutions of different kinds, e.g. waste water from industries, but also for removing and possibly recovering metals from gaseous media.

In the following, the invention is described in more detail by referring to a preferred embodiment, namely the precipitation of heavy metals from solutions, but the invention is naturally not limited thereto. Thus, according to the invention, gases containing mercury can be scrubbed or purified.

The metals which can be precipitated, and which in the present context are designated heavy metals for the sake of simplicity, are those with higher redox potentials than the metals in the sheet, and are, inter alia, mercury, lead, cobalt, silver, gold, copper, zinc, cadmium, bismuth, manganese, arsenic, tin and nickel. These metals (excepting manganese) precipitate in metallic form. In the medium from which the metals are removed, the metal is usually present in the shape of ions, or the metal can also be present in the shape of an undissociated organic compound, e.g. tetraethyl lead and organic mercury compounds. The process according to the invention functions even when the metal is in elemental form however, e.g. mercury in air.

According to the invention the heavy metal content in the solution can be lowered to very low values, and attempts have shown that the content of certain heavy metals can be lowered to the order of magnitude 10 $\mu$g/l solution.

As mentioned above, the solution from which the metal is to be removed suitably has a pH of 2–13, but preferably 4–12 and even more preferably 5–10. An acidic environment is often utilized, but when precipitating zinc and silver, for example, the precipitation is carried out in the alkaline region.

According to one embodiment of the invention the activator is introduced in the shape of a pre-produced complex, e.g. an NaAl complex, preferably $Na_3[Al(OH)_6]$. This halogenide-free complex is particularly suitable in the treatment of solutions containing certain metals, e.g. lead or silver, where the halogenide ions would cause problems by reacting chemically, for example, with the elemental metal and thereby make necessary a further step in recovery or extraction. It should also be noted that the elemental form is in general less soluble than the chloride, and therefore said chemical reaction is also unsuitable when only destruction is intended.

According to another embodiment the activator is formed in situ by introducing into the solution in question one or several of its components which form a complex in the solution. As an example, it can be mentioned that an aluminum hydroxychloride with the schematic composition $Al(OH)_xCl_y$ and a sodium salt. The aluminum hydroxychloride can thereby be obtained by dissolving aluminum sheet with a thickness of at most 0.05 mm in hydrochloric acid, and the solution thus obtained may be used as such and introduced separately into the heavy metal solution simultaneously as a solution of the sodium salt is introduced therein.

The NaAl complex is suitably added to an amount of 2–6 grams/liter of the heavy metal-bearing solution.

It should be noted with regard to the sodium solution used in this process that in principle any sodium salt whatsoever can be used, but that sodium chloride is often preferred because of its low price and accessibility. The nature of the sodium salt is naturally suited to the composition of the solution which is to be treated. It is thus suitable to use sodium acetate in solutions containing silver.

The aluminium sheet introduced by the method according to the invention into the heavy metal solution has a thickness not exceeding 0.15 mm for a low heavy metal concentration in the solution and where the solution pH is between 2 and 13.

According to a further preferred embodiment the heavy metal-bearing solution which is to be purified contains one or more polar solvents from the group of water and polar organic solvents.

In the cases where the heavy metal, such as lead or mercury is a part of a non-polar solvent such as naphtha, paraffin, petrol, benzene and similar hydrocarbons, a polar solvent miscible with the solvent must be added, e.g. a ketone (such as acetone or methylethylketone), or an alcohol (such as methanol, ethanol, isopropanol, or n-propanol).

Certain metals are preferably precipitated from an acidic solution, optimally at a pH between 4 and 5. Such metals are nickel, cadmium, cobalt and bismuth. Other metals are suitably precipitated from an alkaline solution. Examples of such are zinc, silver and tin.

Both organic and inorganic acids are used to adjust an acidic pH, e.g. hydrochloric acid, sulfuric acid, nitric acid and acetic acid, preferably the latter acid, since with acetic acid the above-mentioned complications with chloride ions are usually avoided, and other complications such as coloring effects, precipitation etc. are also avoided, and since acetic acid gives a very suitable pH. For increasing pH in acidic solutions it is suitable to use hydroxides of sodium or calcium or, in an organic solution, an organic base such as ethylene diamine.

The precipitation of heavy metals which is obtained at the bottom of the reactor vessel can, depending on the metal in question, be dissolved in an acidic or alkaline environment. In a case like this, the metal sheet must be allowed to remain in the solution after termination of the reaction to circumvent such dissolution.

A part of the metal sheet, e.g. the aluminum sheet in the heavy metal-bearing solution, must be in contact with the air during the reaction. In this connection it should be pointed out that the best effect is obtained if the activator, e.g. in the shape of the NaAl complex, is added up against, or in the vicinity of the metal sheet.

As has been mentioned above, the process according to the invention is suitable for purifying solutions containing heavy metals in low concentrations. In use, a thin aluminum sheet is perforated and consumed during the reaction and the remains of the sheet then fall down onto the bottom of the reaction vessel where they are mixed with the obtained precipitate. This does not involve any disadvantage when the precipitate is to be discarded. However, if it is desired to recover the heavy metal contained in the solution (which is of interest in concentrations of the order of magnitude several grams per liter and above), the reaction is initiated with a thinner aluminum sheet, this being thereafter replaced with a considerably thicker aluminum sheet, on which the metal precipitates and can be utilized, e.g. by the precipitate being shaken from the metal sheet so that it falls down onto the bottom of the vessel. When using such a sheet of thicker metal, the sheet is not destroyed as described previously, and contamination of the metal precipitate on the bottom is circumvented.

In purifying air or hydrogen gas containing vaporized mercury the air is caused to flow against and over a foil or sheet, e.g. of aluminium, which has been activated with a solution of the activator. The solution can be applied by spraying. Only a portion of the surface of the sheet is activated. The metal foil or sheet activated by the activator is preferably part of a filter of a suitable kind. The effect is reinforced if hydrogen is also included in said air.

The invention is illustrated more closely in the following non-restricting working examples.

EXAMPLE 1

200 liters of a mercury pickling agent consisting of benzene and containing 0.8% mercury in the form of methylmercury is charged in a reaction vessel. A storage roll of aluminum foil with a thickness of 0.05 mm was arranged above the vessel and the foil was drawn out to a length of 1 m and submerged in the solution. 5 liters methanol were thereafter added to the solution. About 400 g aluminum hydroxychloride were dosed with a small amount of sodium chloride and the mixture was dissolved in methanol. This solution was added as activator to the mercury/pickling agent solution. A precipitate thereby started to form simultaneously as the aluminum foil was consumed. When the aluminum foil was no longer being consumed (after about 12 hours) the precipitate was filtered off and the solvent phase was analyzed with respect to mercury, whereon it was found that the residue of mercury was 0.01 mg/l.

The precipitate on the bottom, and the aluminum foil, said precipitate containing mercury (black patches) were placed in a flask and 1 N HCl was added whereafter the whole was carefully heated to 40° C and reshaken, whereby the drops of mercury obtained in the process coalesced together.

EXAMPLE 2

50 liters automobile petrol with an addition of 0.5% tetraethyl lead was mixed with 2 liters methanol and ethylene diamine to adjust the pH to 9 and was then charged into a reaction vessel. 200 g of the activator set forth in example 1 dissolved in methanol was added, whereafter the aluminum foil was submerged in the vessel as in example 1. When the reaction had stopped (after about 8 hours) the precipitate formed was filtered and the petrol was analyzed for the residue lead content. The latter was found to be 0.1 mg/l.

EXAMPLE 3

In 50 liters water containing mercury (II) chloride in an amount of mercury of 2 mg/l the pH was increased from 1 to 6 by addition of NaOH, whereafter aluminum foil was submerged as in example 1. 300 g of the activator, set forth in example 1, in solution with water was added. The reaction started first after the reaction mixture was heated to 40° C. After the reaction had stopped, the precipitate was filtered off and the filtrate was analyzed for mercury. The mercury residue was found to be 0.01 mg/l.

EXAMPLE 4

1 liter of copper sulfate solution containing 30 g crystallized copper sulfate per liter was mixed with 3.5 g disodium hydrogen phosphate crystals. The solution was heated to about 40°-50° C whereafter 15 ml concentrated phosphoric acid and 3.5 g aluminum sulfate crystals were added. In carrying out the method in the way which is apparent from the above example the copper was precipitated in metallic form. The reaction time at 50° C was 15 minutes. The precipitated copper was filtered off and the colorless filtrate was put into a sodium sulfide solution whereat no copper reaction could be observed.

EXAMPLE 5

2 liters of a water solution containing 30–50 g zinc sulfate, the pH was adjusted from acidic to alkaline (about pH 9). An amount of sodium cyanide corresponding to the amount of zinc sulfate was added whereupon the obtained precipitate dissolved. The solution became clear after heating to a maximum of 60° C. Thereafter 20 ml of a solution of sodium aluminate was added in the form of $Na_3[Al(OH)_6]$. A piece of aluminum foil (about 10 g) was immersed in the solution so that a portion thereof was in contact with the air. Zinc started to precipitate, first on the foil and thereafter on the bottom of the vessel.

By the addition of new aluminum foil in the way described above, the reaction was accelerated and the precipitation process was shortened, until the zinc content in the solution fell below 100 mg/l $Zn^{++}$.

EXAMPLE 6

To 1 liter $Pb^{++}$ solution containing 10 g of crystallized lead acetate were added 10 ml concentrated acetic acid and a NaAl complex made up from 2 ml aluminum hydroxychloride and 1 g sodium acetate. The aluminum foil was immersed and the whole was stirred and shaken. Within the space of 10 minutes a lead precipitate was obtained on the bottom of the reaction vessel. It was apparent that lead in metallic form was obtained, since on addition of 1 ml mercury in such a way that the mercury came into contact with the precipitate, the black precipitate immediately disappeared and a lead amalgam was formed.

The precipitated heavy metal obtained according to the method according to the invention also falls within the scope of the invention.

What is claimed is:

1. A method for removing one or more heavy metals from a fluid containing same, said heavy metal being selected from the group consisting of mercury, lead, cobalt, silver, gold, copper, zinc, cadmium, bismuth, manganese, arsenic, tin and nickel, which comprises the steps of placing a metal sheet in said fluid so that a portion of the surface of said sheet contacts said fluid and another portion of said sheet surface contacts the ambient air, said metal sheet being made of a metal having a lower redox potential than said heavy metal; contacting said fluid and said sheet with a solution of a complex effective as an activator to cause said heavy metal to precipitate in the fluid; and then separating said precipitate from said fluid.

2. A process as claimed in claim 1 in which said metal sheet is an aluminum foil and said complex is a complex of sodium and aluminum.

3. A method as claimed in claim 2, wherein said complex is $Na_3[Al(OH)_6]$.

4. A method as claimed in claim 2, wherein said complex is prepared by mixing together aluminum hydroxychloride and a sodium salt.

5. A method as claimed in claim 2 in which said fluid is a gas containing mercury.

6. A method as claimed in claim 2, wherein said fluid is a liquid having a pH of between 2 and 13.

7. A method as claimed in claim 6, wherein said complex is produced in situ in said liquid by adding to said liquid a solution of aluminum hydroxychloride and a solution of a sodium salt.

8. A method as claimed in claim 7, wherein the aluminum hydroxychloride is produced by dissolving aluminum foil with a thickness of not more than 0.05 mm in hydrochloric acid.

9. A method as claimed in claim 6, wherein the aluminum foil has a thickness of not more than 0.15 mm.

10. A method as claimed in claim 6, wherein said liquid is a non-polar hydrocarbon containing one or more polar organic solvents.

11. A method as claimed in claim 6 in which said liquid is heated to 40° to 60° C.

12. A method as claimed in claim 6 in which the complex is added in an amount of 2 to 6 g/l of said liquid.

13. A method as claimed in claim 6 in which said liquid has a pH of between 4 and 12.

14. A method as claimed in claim 6 in which said liquid has a pH of between 5 and 10.

15. A method as claimed in claim 6 in which said heavy metal is zinc, silver or lead and said liquid has an alkaline pH.

16. A method as claimed in claim 6 in which said heavy metal is nickel, cadmium, cobalt or bismuth and said liquid has an acidic pH.

17. A method as claimed in claim 6 in which said liquid is water.

* * * * *